United States Patent Office 3,423,553
Patented Jan. 21, 1969

3,423,553
ARC-EXTINGUISHING APPARATUS FOR
ELECTRIC SWITCHES
Rudolf Prätsch, Berlin, Germany, assignor to Siemens Aktiengesellschaft, a corporation of Germany
Filed July 27, 1966, Ser. No. 568,188
Claims priority, application Germany, July 28, 1965,
S 98,472
U.S. Cl. 200—148      3 Claims
Int. Cl. H01h 33/82

My invention relates to electric switches, such as circuit breakers, for example, which are operatively connected with a closed gas circuit and a compressor for maintaining a pressure differential between two regions of the gas circuit. This pressure differential is required to achieve a gas stream or gas blast for extinguishing the arcing which occurs when the switch opens, and the gas stream can in certain cases also be used for actuating the elements of the switch.

In apparatus of the above type it is conventional to connect to the compressor a control switch which sets the compressor into operation when the desired pressure differential is not present, the control switch stopping the operation of the compressor when the predetermined pressure differential is again achieved. For this purpose it is possible to use, for example, a control switch as shown in German Patent 691,130, this switch responding only to pressure. Such a control switch can include, for example, a piston which moves in opposition to a spring and which during its movement closes and opens electrical contacts.

A control of the compressor which is determined only in accordance with the pressure is not sufficient to take care of all operating conditions if the density of the gas changes considerably depending upon the temperature. In such a case it can happen that at high temperatures the pressure controlled by the control switch corresponds to a gas density which is too small so that the extinguishing function of the gas under pressure is insufficient.

According to U.S. Patent 3,129,309, temperature-compensated control switches are used for controlling the compressor. With this construction the switch contacts are actuated not only by way of a piston which acts in opposition to a spring, but also with respect to a pressure which opposes the piston, or a gas bellows, and which is determined by the thermal expansion of a fluid, which is in thermal connection with the gas to be controlled so that in accordance with the temperature of the gas there will be a greater or lesser counterpressure. Such temperature-compensated control switches render an ideal control possible, since with correct determination of the temperature relations of the gas it is possible to provide an adjustment which will maintain a constant gas density independent of the gas temperature. This control requires, however, considerable cost because of the mounting of additional temperature-sensing structure and because of the relatively complex adjustments of the force derived from the temperature-sensing structure.

It is therefore a primary object of my invention to provide for gas pressure actuated switches of the above type a better pressure control, taking into consideration the temperature.

In particular it is an object of my invention to provide a structure which is capable of achieving a suitable control, determined by temperature as well as pressure, without requiring the complications and costs involved in structures such as those referred to above.

In accordance with my invention the compressor is controlled by at least a pair of pressure-responsive switch means and one of these pressure-responsive switch means is rendered operative by a thermostat means which responds to a given temperature.

With the control of my invention the pressure-temperature relation of the gas is not continuous as in the case of the above temperature-compensated switching arrangements but is instead brought about in a stepwise manner. This type of control might appear at first to be a technical step backward. In the most surprising manner, however, it has been demonstrated that the control of my invention is sufficiently accurate for practically all temperature variations encountered in all cases in gas-pressure operated switch structures of the above type, and at the same time the structure of my invention presents with respect to the known temperature-compensated controls the advantage that it is possible to achieve the desired results with considerably simpler and less expensive control switches. Thus, with my invention considerable savings are achieved, although in order to control the compressor at least a pair of pressure-responsive switch means are required.

In carrying out my invention the control of the switches is preferably brought about at the low-pressure region of the gas circuit. The temperature-dependency of the gas at low pressures is not so strongly noticeable as at high pressures, as explained further below.

My invention is illustrated by way of example in the accompanying drawings which form part of this application and in which.

Figure 1:
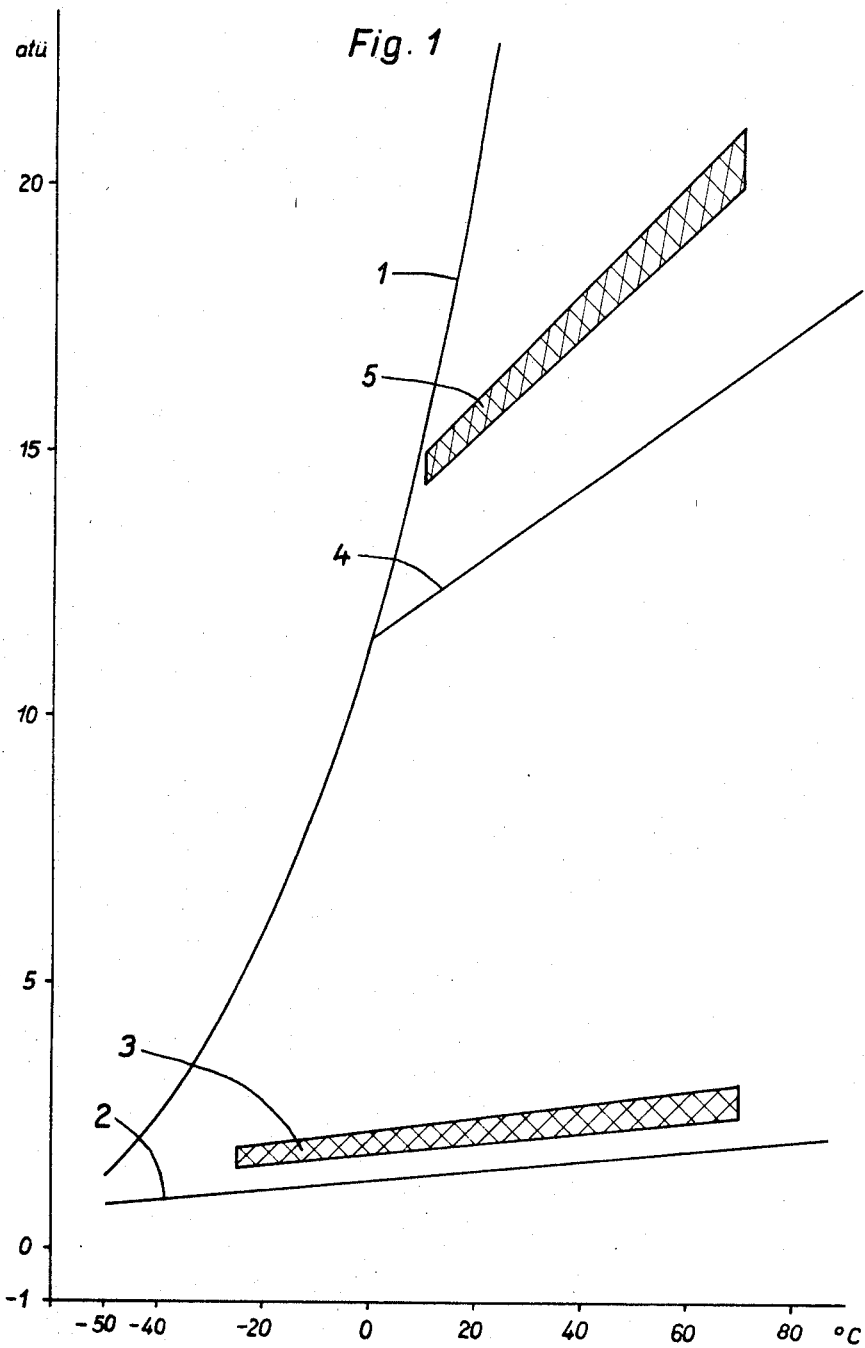
FIG. 1 is a graph of the pressure-temperature relationships of a gas used in an installation of the above type.

Referring now to FIG. 1, there is illustrated therein a pressure-temperature diagram for sulfur hexafluoride ($SF_6$). This gas, as is well known in gas-pressure operated switches of the above type, has been used with good results in a closed gas circuit, because in addition to having an efficient capability of extinguishing an arc it possesses outstanding electrical insulating properties. The abscissa of FIG. 1 indicates the temperature in ° C. while the ordinate indicates the pressure in atmospheres.

The curve 1 represents the critical pressure curve at which the gas becomes liquefied. To the right of the curve 1 in FIG. 1 are curves of constant gas density indicating the desired operating characteristics for a gas-pressure switch installation of the above type where the $SF_6$ is supplied to a high pressure container from which the gas blast used for extinguishing the arc is received in a low pressure container. From the low pressure container the gas is delivered by a compressor back to the high pressure container, as indicated in U.S. Patent 3,129,309. The operating curves indicated in FIG. 1 include the lower curve 2 which indicates the responding curve for a signal switch which senses the minimum pressure in the low pressure region of the gas circuit. The next higher operating region 3 is the operating region for the control switch which controls the compressor. The curve 4 is the curve which indicates the response of the switch to a signal at the high pressure region, and when the pressure is below that indicated by the curve 4 blocking of switch opening occurs (the operation of the device is prevented). The region 5 of FIG. 1 indicates the gas pressure at the high pressure region of the circuit corresponding to the compressor control in the low pressure region.

The operating curves indicated in FIG. 1 correspond to a constant gas density, which is particularly important for the extinguishing action. These operations cannot be derived only from pressure-responsive switches. For example, the upper limit of the operating region 3 for the compressor-controlling switch in the low pressure region is situated at −25° C. at less than 2 atmospheres and at +65° C. at over 3 atmospheres. In the high pressure region the corresponding gas pressure increases, as indicated by the curve 5, from 15 atmospheres at +10° C. to 21 atmospheres at +65° C., while at a pressure of 15 atmospheres at 65° C. the gas will only have a gas density which is ⅔ of the gas density at 65° C. and 21 atmospheres. It is to be understood in FIG. 1 that the high pressure region is always maintained at a temperature above the liquefying point of the gas.

These operating curves for constant gas density can only be achieved with the above-mentioned temperature-compensated control switches. On the other hand, FIG. 2 shows for the same switch installation a corresponding diagram of operating curves which is achieved with normal pressure-responsive switches and which at the same time can provide with assurance a satisfactory functioning of the installation.

Instead of the curve 2 of FIG. 1, there is a corresponding minimum signal curve for the low pressure region derived from a single pressure-responsive switch whose operation is indicated by the curve 10. This is permissible inasmuch as the variation from a curve of constant density is only on the order of 1 atmosphere, approximately.

The compressor, however, in accordance with my invention, is controlled by two conventional pressure-responsive switches operatively connected with the low-pressure container, and of these switches one is rendered operative at a given temperature by way of a thermostat. As a result the operating range 3 of FIG. 1 is replaced by a pair of limiting ranges 12 and 13 separated by the operating line 11 of the thermostat, this line 11 being situated at 40° C. Thus, one of the pressure-responsive switches maintains the temperature range from −25° to +40° C. constantly at a pressure of between 1.7 and 2.2 atmospheres. At temperatures higher than 40° C., the compressor is set into operation by the second pressure-responsive switch at a pressure of 2.4 atmospheres and the compressor has its operation terminated through this control at a pressure of 3.2 atmospheres.

Figure 2:
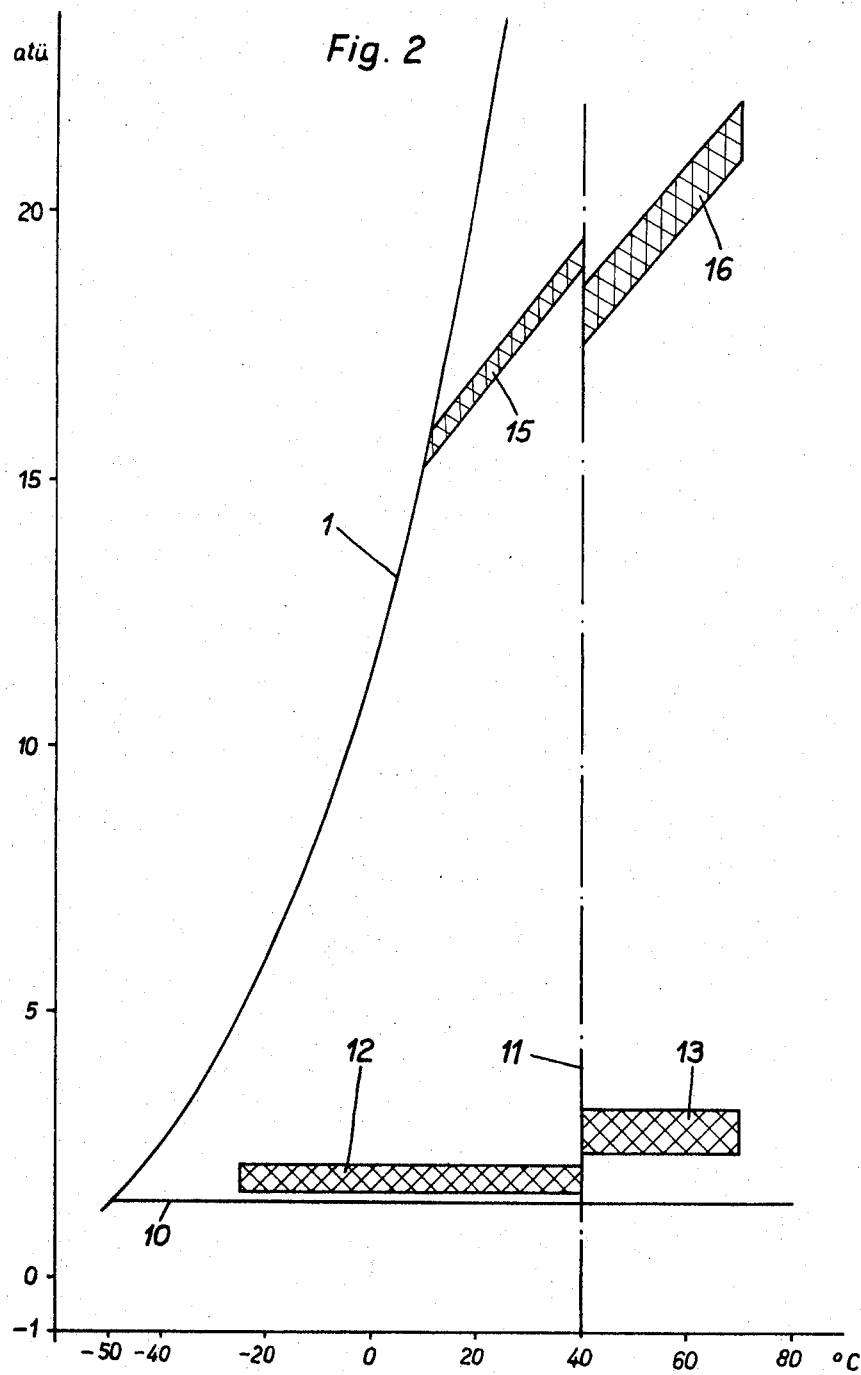
FIG. 2 is a graph illustrating the operation of my invention.

These pressures in the low pressure region correspond to the operating regions 15 and 16 of the high pressure region of the gas circuit, these regions 15 and 16 being indicated in FIG. 2. As is apparent from FIG. 2, these curves no longer extend along curves of constant gas density. The variation from curves of constant gas density is slight, however. This variation is less than 10%, although only two pressure-responsive switches are used for closely approaching a curve of constant gas density. The installation is therefore completely operative in a highly satisfactory manner with the controls of my invention.

My invention is not limited to control of the compressor. It can also be advantageously used independently of compressor control if, for example, the curve 4 of FIG. 1 is to be approached by two or more conventional pressure-responsive switches which are rendered operative by one or more thermostats which respond to given temperatures.

Figure 3:
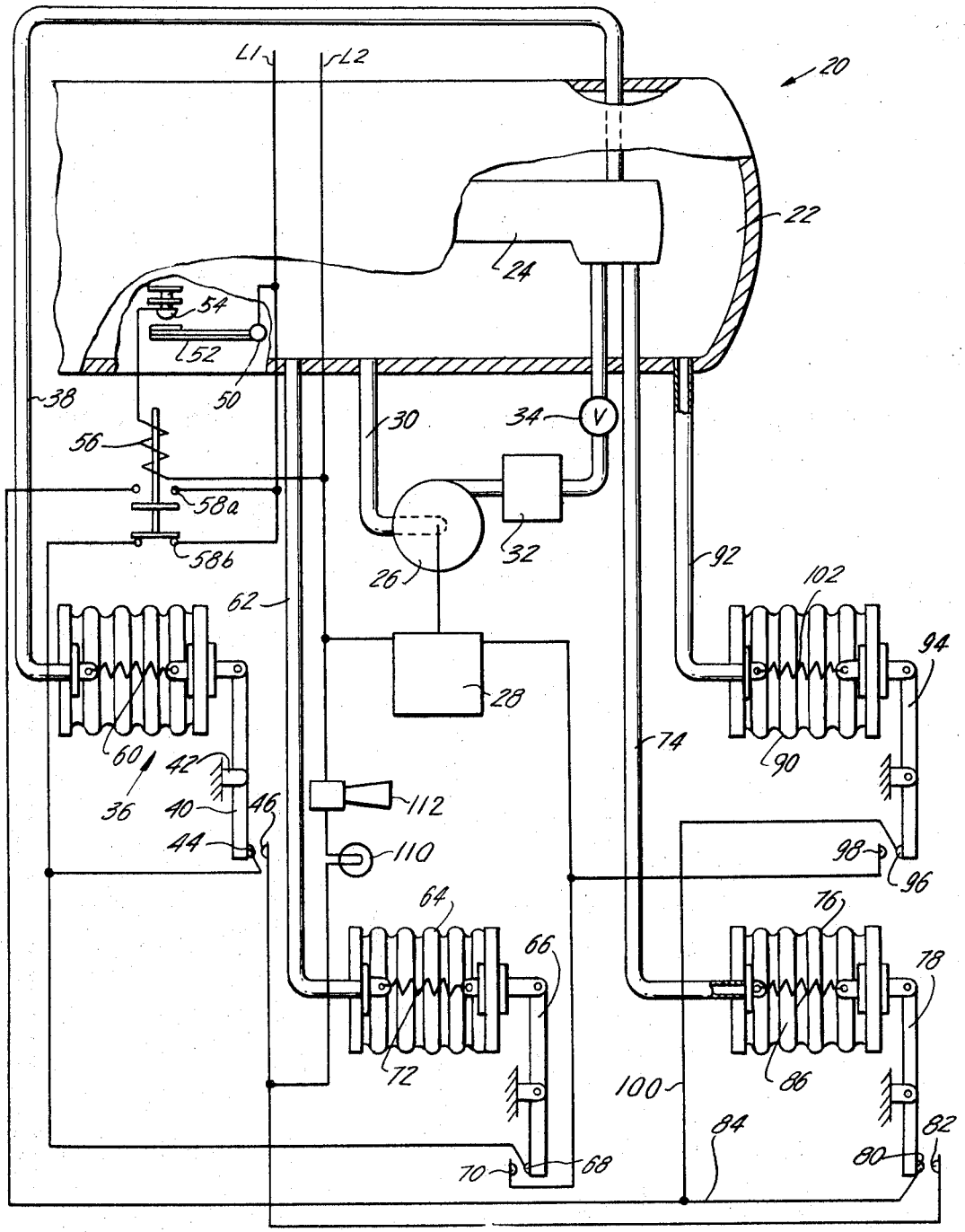
FIG. 3 is a schematic illustration of one possible structure according to my invention.

As one possible example of a structure according to my invention, FIG. 3 shows an installation 20 of the above type including an outer low pressure gas container 22 and an inner high pressure gas container 24 from which in a known way is derived the gas blast used for extinguishing the arc which occurs upon opening of the switch. The compressor 26 is driven by an electric motor 28 and communicates at its suction side, by way of a conduit 30 with the interior of the low pressure container 22 and at its pressure side the compressor 26 discharges into a suitable tank 32 which, for example, by way of a suitable valve 34 communicates with the high pressure container means 24. Thus, the motor-driven compressor means 26, 28 communicates through the suction conduit 30 with the low pressure container means 22 and through suitable high pressure conduits with the high pressure container means 24.

A first pair of pressure-responsive switch means are provied for responding to the pressure in the container means 22 so as to control the operation of the compressor 26 in order to maintain a predetermined pressure differential in the gas in the low and high pressure container means. A second pair of switch means include, as schematically shown in FIG. 3, a bellows 36 communicating by way of a conduit 38 with the high pressure container means 24 and acting on the lever 40 to turn the latter about its pivot 42 so as to cause the contact 44 to move toward and away from the stationary contact 46. This contact 46 is electrically connected with a lamp 110 and horn 112 which are in turn connected with the line conductor $L_2$. The other line conductor $L_1$ is conected to a thermostat means 50 which is in communication with the interior of the low pressure container 22 so as to respond to the temperature therein, and in accordance with this temperature the deflectable member 52 of the thermostat will assume given angular positions. It is this member 52 which is connected electrically with the other line conductor $L_1$ and which moves toward and away from the electrical thermostat contact 54 which is adjusted to a position which corresponds to the temperature of 40°, in accordance with the illustration in FIG. 2. When the element 52 of the thermostat means 50 engages the contact 54, at the 40° temperature and higher, relay 56 of the thermostat means is energized to close switch 58a which is open below 40° when the relay is unenergized as shown. In this latter position, switch 58b is closed, and the circuit goes from the line conductor $L_1$ to the movable contact 44 carried by the lever 40. As the pressure in the high pressure container 24 builds the bellows 36 will act on the contact 44 to displace it away from the contact 46 so as to open the circuit when a given upper pressure is reached. An adjustable spring assembly 60 schematically indicated in FIG. 3 acts to automatically close the switch 44, 46 when a lower pressure is reached in the high pressure container 24, and at this time the circuit through the lamp and horn will be completed, so that, independently of operation of the compressor 26, an alarm is given indicating that this pressure is too low. Such an alarm will be produced, for example, if there is a leak in the tank 32.

The low pressure container 22 communicates through a conduit 62 with a second bellows 64 which actuates a lever system 66 to displace a movable contact 68 toward and away from a stationary contact 70 which is connected to the motor 28, and this arrangement will close the motor circuit when the pressure in container 22 builds up to a certain level, whereas the adjustable spring 72 will open this circuit when a predetermined low pressure is reached.

The high pressure container 24 also communicates through a conduit 74 with a bellows 76 which, through a lever system 78 controls a movable contact 80 so as to move it toward and away from a stationary contact 82 which is connected to the lamp 110 and horn 112. The movable contact 80 is connected by a conductor 84 to the switch 58a of the thermostat means so as to be rendered operative at temperatures above 40° C., and a spring assembly 86, which is adjustable, is provided for closing the circuit when a given low pressure is reached while the bellows 76 will open the circuit when a given high pressure is reached.

An additional bellows 90 communicates through a conduit 92 with the low pressure container 22 and actuates a lever system 94 to move a movable contact 96 toward and away from the stationary contact 98 which is connected to the motor 28, the movable contact 96 being connected to the switch 58a of the thermostat means by way of a conductor 100, and this assembly also includes an adjustable spring 102 so that when a given low pressure is reached the spring will open the circuit while when a given high pressure is reached the bellows 90 will act to close this circuit.

In this way the structure of FIG. 3 will provide the operation which is indicated diagrammatically in FIG. 2.

In addition the structure can be used simply to give a predetermined signal. For this purpose the signalling device 110, in the form of a lamp, the horn 112, or the like, are provided to give a signal independently of the compressor 26.

Thus, it will be seen that the single pair of switch means which respond to the pressure in the low pressure container are controlled by the thermostat means to operate at different temperature ranges so as to maintain the pressure differential between the high and low pressure containers. On the other hand, the signaling structure which is also controlled by the thermostat means operates completely independently of the compressor to give an alarm under conditions such as those referred to above.

I claim:

1. In an apparatus for extinguishing, by means of a gas blast, an arc at a switch when the switch opens, high pressure container means for containing a gas at high pressure and from which the gas blast is derived, low pressure container means for containing a gas at a low pressure to be supplied from said low pressure container means to said high pressure container means, motor-driven compressor means communicating with both of said container means for sucking gas from said low-pressure container means and for delivering gas at high pressure to said high pressure container means, a pair of pressure-responsive control switch means operatively connected with one of said container means and with said compressor means for automatically actuating the latter to maintain a given pressure differential between said low pressure container means and said high pressure container means, one of said control switch means maintaining a pressure differential in one range and the other of said control switch means maintaining the pressure differential in a second range, and thermostat means operatively connected with said one of said container means for responding to the temperature of the gas therein and operatively connected said pair of control switch means for rendering said one control switch means operative only when the temperature of the gas in said one container means is in given range.

2. The combination of claim 1 and wherein said thermostat means is operatively connected with said low pressure container means for responding to the temperature of the gas therein.

3. The combination of claim 1 and wherein a signal means is controlled by said thermostat means independently of said compressor means for signaling when the pressure in one of said container means is at a given value in one temperature range.

References Cited

UNITED STATES PATENTS

| 3,129,309 | 4/1964 | McKeough et al. | 200—148.2 |
| 3,280,288 | 10/1966 | Frowein | 200—148.5 |
| 3,359,390 | 12/1967 | Frowein | 200—148.5 |

FOREIGN PATENTS

| 693,435 | 9/1964 | Canada. |

ROBERT S. MACON, *Primary Examiner.*